US012208905B2

(12) United States Patent
Steinmayer et al.

(10) Patent No.: US 12,208,905 B2
(45) Date of Patent: Jan. 28, 2025

(54) AIRFLOW-GUIDING COMPONENT AND METHOD OF PRODUCTION (71) Applicant: Diehl Aviation Laupheim GmbH, Laupheim (DE)

(72) Inventors: Peter Steinmayer, Schwendi (DE); Manuel Mayer, Burgrieden (DE); Andre Pfetscher, Ulm (DE); Fabian Ade, Baienfurt (DE); Dirk Pfinder, Balzheim (DE); Marco-Reyes Janke, Neu-Ulm (DE); Jean-Baptiste Mine, Bad Waldsee (DE)

(73) Assignee: Diehl Aviation Laupheim GmbH, Laupheim (DE)

( * ) Notice: Subject to any disclaimer, the term of this patent is extended or adjusted under 35 U.S.C. 154(b) by 600 days.

(21) Appl. No.: 17/206,500

(22) Filed: Mar. 19, 2021

(65) Prior Publication Data

US 2021/0206496 A1 Jul. 8, 2021

Related U.S. Application Data (63) Continuation of application No. PCT/EP2019/075592, filed on Sep. 24, 2019.

(30) Foreign Application Priority Data

Sep. 24, 2018 (DE) .......................... 102018007505.3

(51) Int. Cl.
*B64D 13/06* (2006.01)
*B29C 44/44* (2006.01)
*B29L 31/30* (2006.01)

(52) U.S. Cl.
CPC ............ *B64D 13/06* (2013.01); *B29C 44/445* (2013.01); *B29L 2031/3076* (2013.01)

(58) Field of Classification Search
CPC ...... B64D 13/00; B64D 13/06; B29C 44/445; B29L 2031/3076; Y02T 50/40
USPC .......................................................... 454/71
See application file for complete search history.

(56) References Cited

U.S. PATENT DOCUMENTS

| 6,752,712 B1* | 6/2004 | Short ..................... B64D 13/00 454/76 |
| 9,067,678 B2 | 6/2015 | Edom et al. |
| 10,086,580 B2 | 10/2018 | Hoefle et al. |
| 2012/0248839 A1 | 10/2012 | Fujita et al. |

(Continued)

FOREIGN PATENT DOCUMENTS

| DE | 102008050546 A1 | 4/2010 |
| DE | 202012004525 U1 | 9/2012 |
| DE | 102013002893 A1 | 8/2014 |

(Continued)

*Primary Examiner* — Allen R. B. Schult
(74) *Attorney, Agent, or Firm* — Laurence A. Greenberg; Werner H. Stemer; Ralph E. Locher (57) ABSTRACT A component for guiding an airflow in an air-conditioning system of an aircraft includes at least one structural part, at least one inlet opening and at least one outlet opening for air. At least two partial shells are interconnected in an airtight manner in such a way that the inlet openings and the outlet openings remain clear. The partial shells are particle foam parts. A method for producing the component incudes forming the partial shells of particle foam, and interconnecting the partial shells to form the component.

12 Claims, 5 Drawing Sheets (56) References Cited

U.S. PATENT DOCUMENTS

2018/0127100 A1  5/2018  Roth
2020/0207939 A1  7/2020  Trassl et al.

FOREIGN PATENT DOCUMENTS

| DE | 102016121366 A1 | 5/2018 |
| EP | 1299219 B1 | 10/2004 |
| EP | 1959209 A2 | 8/2008 |
| WO | 2016004522 A1 | 1/2016 |
| WO | 2019038213 A1 | 2/2019 |

* cited by examiner

AIRFLOW-GUIDING COMPONENT AND METHOD OF PRODUCTION

CROSS-REFERENCE TO RELATED APPLICATION

This application is a continuation, under 35 U.S.C. § 120, of copending International Application PCT/EP2019/075592, filed Sep. 24, 2019, which designated the United States; this application also claims the priority, under 35 U.S.C. § 119, of German Patent Application DE 10 2018 007 505.3, filed Sep. 24, 2018; the prior applications are herewith incorporated by reference in their entirety.

BACKGROUND OF THE INVENTION

Field of the Invention

The invention relates to a component for guiding an airflow in an air-conditioning system of an aircraft and to a production method for the component.

Previously, airflow-guiding components in aircraft have been produced from fiber-reinforced plastics materials (carbon or glass fibers in a plastics matrix), in a sandwich structure (fiber components and honeycomb structures) or in a hybrid construction (carbon and glass fibers in a plastics matrix). Complex components (such as air outlets) are produced from a plurality of individual components which are joined together in a labor-intensive manner.

Thus, for the known production of such a component, for example a plurality of layers of prepreg are inserted in a hot-press tool alone or in conjunction with PVDF (polyvinylidene fluoride) foam or honeycomb and/or film. Both halves of the tool provide shaping, and the inserted layers are pressed under a defined pressure and temperature, the layers set and join together.

Two half shells are produced, which, in a downstream process step, are bonded to one another together with the necessary attachments and mounting parts.

German Patent Application DE 10 2016 121 366 A1, corresponding to U.S. Patent Application Publication No. 2018/0127100, discloses a cladding panel including a panel element, a rectangular through hole and a flap. The cladding panel includes a flap which is rotatable about a joint, which is integrated in the panel element, to open and/or close the rectangular through hole.

European Patent EP 1 299 219 B1 discloses a method for producing shaped parts from particle foam having a covering layer.

German Utility Model DE 20 2012 004 525 U1 discloses an inspection flap system for reversibly closing an opening in a housing, wall or ceiling cladding, including a frame and a lockable flap. The frame and the lockable flap are produced from particle foam and are integrated in a housing, wall or ceiling element which is likewise produced from particle foam.

U.S. Patent Application Publication No. 2012/0248839 A1 discloses a cushion structure that does not cause pain to a user when seated and promotes steady breathing.

BRIEF SUMMARY OF THE INVENTION

It is accordingly an object of the invention to provide an airflow-guiding component and a method of production, which overcome the hereinafore-mentioned disadvantages of the heretofore-known components and methods of this general type and which propose improvements with respect to airflow-guiding components.

With the foregoing and other objects in view there is provided, in accordance with the invention, a component for guiding airflow in an air-conditioning system of an aircraft, including at least one inlet opening and at least one outlet opening for air, at least two partial shells, the partial shells being interconnected in an airtight manner in such a way that the inlet openings and the outlet openings remain clear, the partial shells being particle foam parts, and the component containing at least one structural part.

The component is used to guide air, that is to say for guiding airflow. The airflow is guided inside or in an air-conditioning system of an aircraft. Such components are also referred to as airflow-guiding or air-conditioning components.

The component includes at least one inlet opening for air and at least one outlet opening for air. In particular, precisely one inlet opening is provided. In particular, precisely one outlet opening or a plurality of outlet openings, e.g. three, four or more outlet openings, is/are provided. The component contains at least two partial shells, in particular precisely two partial shells, in particular in the form of half shells.

When the component is assembled and finished, the partial shells are interconnected in an airtight manner. During and after connection, the inlet openings and outlet openings remain clear so that the component can carry out the function thereof of internally guiding airflow from the inlet openings to the outlet openings.

The partial shells are particle foam parts, that is to say that these shells are made from particle foam during the production thereof.

The aircraft is in particular a passenger aircraft. The component is intended in particular for the interior of the aircraft and is mounted therein when installed. The interior is in particular a passenger cabin. The component is in particular an air outlet component, in other words the air outlets open into a free space, in particular the interior of the aircraft.

In addition to saving on weight, using particle foam also generally decreases the process times during production. Thus, in the above-mentioned known or established methods, the above-mentioned known components are produced in a hot press, which requires approximately 15 minutes of process time. By contrast, the particle foaming takes approximately five minutes for a comparable component.

The invention is based on the finding that, by foaming materials, a material group of the particle foams is produced which, as a result of the specific structure and related properties thereof, opens up different possible uses and thus new areas of application.

Desired properties of the foam can be achieved by selecting the right material and the foaming method.

Within the group of polymer foams, producing particle foams promises enormous potential in terms of lightweight construction, since the main component thereof is formed with over 90% air. The density of a particle foam can currently be varied in a range of from 8-200 g/l. This density can be used to influence other properties such as the mechanical properties or thermal insulation properties.

In one preferred embodiment, the component contains at least one structural part. Through the use of structural parts, various components can be produced which could not be achieved by the partial shells alone.

In one preferred variant of this embodiment, the structural part is an air-conducting element which brings about airflow guidance in and/or on the component. In this way, desired airflow-guiding properties can be achieved in and/or on the component.

In one preferred variant of this embodiment, the air-conducting element is an outlet part which forms at least one, in particular all, of the outlet openings. In this way, desired outlet properties for the corresponding outlet openings and thus the entire component can be displayed. The outlet part is in particular an outlet grille. In this case, the grille openings form the outlet openings. Outlet grilles are well established as outlet parts.

In one preferred variant of the above-mentioned embodiment, the structural part is a particle foam part. The particle foam technology is thus used not only for the partial shells, but also for the structural parts, and therefore the corresponding advantages also apply for structural parts.

In one preferred variant of this embodiment, the structural part is integrally integrated in or formed in one piece with one of the partial shells. This makes it possible to produce the structural part and partial shell together as a single integrated component. In addition, the final assembly of the whole component can thus be made easier, since there are fewer individual parts to handle.

In one preferred embodiment, which represents an alternative to the above-mentioned particle foam part, the structural part is a structural part which is embedded in the particle foam of a partial shell, and is not a particle foam part. It is thus possible to also incorporate structural parts which in particular could not be produced or could be produced only with difficulty or inadequately as particle foam parts. This applies in particular for metal structural parts and/or support elements as structural parts.

In one preferred variant of this embodiment, the structural part is a bush or a slot bush. The slot bush contains in particular a slide bush which can slide along the slot. A corresponding bush is used as a fixed bearing, with a corresponding slot bush including a slide bush as a floating bearing for the component. In particular by using the floating bearing, changes in dimensions as a result of thermal expansion between the component and the surface to which the component is fastened can be offset. It should be noted that, in particular in the aviation sector, temperature ranges of from −55° C. to +88° C. have to be taken into account.

In one preferred variant of the above-mentioned embodiment, the structural part is an end fitting forming or containing the inlet opening or attached to the inlet opening. Through the use of an end fitting of this type, the component can be connected to other airflow-guiding components.

In one preferred variant of this embodiment, the end fitting is fastened in the component in that it is form-lockingly received between at least two of the partial shells, the end fitting being able to be form-lockingly inserted between these partial shells when they are joined. The corresponding partial shells thus form, together with the end fitting, a form-locking connection—in particular by using the respective components of integrally formed clearances, protrusions, undercuts, grooves, tongues, etc.

In the case of air outlets as components, an end fitting is used in particular as a connecting piece to the adjoining and air-supplying pipeline. The end fitting is produced for example as an injection-molded part and is inserted into a half shell before the joining process. Joining the two half shells produces a loss-proof connection between the end fitting and the air outlet. A flange on the fitting, which flange brings about the form-locking connection (together with a counter piece in the partial shells), transmits torques into the air outlet and/or simultaneously constitutes an anti-rotation lock.

In particular, the end fitting includes a collar which engages in a groove in the partial shells. In particular, an anti-rotation lock is produced between the component and the end fitting.

In one preferred embodiment, at least two of the partial shells include a detachable insertion connection for connection to one another. The insertion connection is placed in particular at the edge of the partial shells. As with the partial shells themselves, the corresponding connection is made of particle foam. In particular, the connection is a tongue-and-groove connection. The insertion connection and the components thereof are thus an integral part of the respective partial shells and are thus particularly simple and inexpensive to produce. During the final assembly, no additional connection/sealing parts are required to interconnect and/or seal the two partial shells. In particular, the insertion connection is dimensioned with slight interference, and the resilient properties of the particle foam are used to produce an insertion connection which has a certain amount of retaining force.

In one preferred variant of this embodiment, the insertion connection is a snap-fit connection (e.g. "snap and click") with an undercut which is engaged behind in the inserted state. In particular, the groove includes the undercut which is engaged behind by a protrusion of the tongue. In this case as well, the resilient properties of the particle foam are used to achieve a flexibility that is required for the snap-fit connection. A corresponding snap-fit connection has a greater retaining force by comparison with a tongue-and-groove connection without an undercut.

In one preferred embodiment, the component contains a securing element which fixes at least two of the partial shells to one another. A securing element of this type is for example a clamp connection, a screw connection, a screw which cuts into the particle foam, etc., in particular, the securing element is produced as an alternative or in addition to the above-mentioned insertion/snap-fit connection.

In one preferred embodiment, the particle foam is expanded polypropylene (EPP). This material is particularly suitable for the relevant use.

With the objects of the invention in view, there is concomitantly provided a method for producing the component (2) according to the invention, wherein the partial shells are made of particle foam, and the partial shells are interconnected to form the component.

The method and at least some of the embodiments thereof and the respective advantages have already been explained analogously in connection with the component according to the invention.

The invention is based on the following findings, observations and considerations and also includes the following embodiments. The embodiments are also referred to herein in a somewhat simplified manner as "the invention." In this case, the embodiments can also contain parts or combinations of the above-mentioned embodiments or correspond thereto and/or optionally also include embodiments that have not been mentioned previously.

The invention is based on the concept of developing airflow-guiding components for air-conditioning systems in aircraft in particle foam which meet aviation requirements. The concept further includes integrating as many functions of the component as possible into the production process in order to achieve fast and cost-effective production. In addition, the thermal properties which are very different between the particle foam and fiber-reinforced plastics materials as a result of the wide operating temperature range of the aircraft, which properties can lead to residual stress in the foam component and to cracks in the structure thereof, are to be considered, and suitable measures for compensating for the thermal effects are to be developed.

According to a basic concept of the invention, the components are formed of two separately foamed half shells made of expanded polypropylene (EPP). In the production process of the half shells, separately produced components (structural parts, (slot) bushes) which function as support elements are also embedded. These components are used as a hard bearing, for defined guidance of the fastener and as tear protection for the particle foam and, during the foaming process of the half shell, are embedded in a precise position and in a form-locking and loss-proof manner.

Through the use of a suitable structural configuration (in particular of the wall thicknesses/taking into account the possible deformation of the components) of the inner functional elements for guiding airflow (air-conducting element), these elements can be foamed together with the half shells in the same process step. It is possible to reproduce the elements in full in a half shell, or only part thereof in each half shell and to interconnect them in the subsequent joining process. The embedded retaining elements described above are configured in corresponding positions with a translational degree of freedom for an additional sliding bearing (slide bush) mounted therein. These sliding bearings can move therein and correspondingly generate a floating bearing with a translational degree of freedom, through the use of which the different thermal linear expansions of the materials can be compensated for.

In the case of the two half shells, the joint seam is in the form of a tongue-and-groove connection, and therefore an initially detachable insertion connection is produced. When the tongue and groove have a suitable construction, merely inserting the tongue into the groove produces a stable connection which is also airtight. In this case, the properties of the foam with respect to deformability and resilience are utilized. Through the use of additional securing elements, the two half shells can be additionally fixed.

A groove is provided in the particle foam half shells so that no complex downstream processing step (such as adhesion) is required even for the introduction of an end fitting as a connecting piece into the adjoining pipeline. The end fitting has a web (collar) corresponding to the groove and, during the process of joining the two half shells, is inserted in the groove, and the joining of the half shells produces a loss-proof connection.

The basic concept of the invention is also that of utilizing the material behavior for the joining connection of the half shells by using a suitable construction of the tongue and groove. A highly integrative production process is achieved by integrating additional functional components into the foaming process, taking into account the thermal behavior of the material. Thus for example a relatively long injection molded part is replaced with a particle foam part: whereas the injection molded part in the particle foam would cause problems for greatly different linear expansions, such problems do not exist for "particle foam in particle foam.". According to corresponding considerations, fixed bearings or floating bearings can also be provided at suitable points of the component (in particular for thermal length compensation). This results in the reproduction of the airflow-guiding geometries in particle foam and the resulting weight saving, and the reduction of additional process steps.

In particular, during the process of producing an air outlet half shell in particle foam, separately produced components (bushes) are inserted in the mold cavity and surrounded by foam when foaming the actual component. A form-locking, loss-proof connection is produced between the foamed half shells and the inserted component. The bushes are used as a hard bearing, for defined guidance of the fastener (hole bearing) and as tear protection for the particle foam, through the use of which the air outlet can be supported.

Through the use of the new technology of the airflow-guiding components in particle foam, when assembling the air outlets with the components (hat rack, secondary structure, primary structure) used for mounting, a connection of materials having very different coefficients of linear thermal expansion is produced. In the case of the foam components, this leads to linear expansion which is increased by a factor of up to five or more. These differences generate residual stress in the foam component and can lead to cracks in the structure thereof.

For the purpose of compensation, slot bushes are integrated in the production process of the air outlet half shells. The size of these slot bushes is adapted to the linear expansion. In these slot bushes, slide bushes are mounted and thus generate a floating bearing having a translational degree of freedom. The air outlet is then fastened for example by using screws through the slide bushes.

Integrating the individual functions and constructing the joint connection as an insertion connection results in a cost-optimized, highly integrative production process.

The invention results in the production of an air outlet in particle foam, formed of two half shells. Additional components for support and for simultaneously compensating for thermal expansion effects, as well as reproducing different airflow-guiding geometries in particle foam, are integrated in the shells. The shells are inserted one inside the other by using a tongue-and-groove connection and are secured by additional securing elements.

The invention results in airflow-guiding components in a particle foam construction (EPP) for the air-conditioning system in aircraft.

The invention offers the advantages of reducing weight, reducing cost, improving the process times, an integrative production process and using a new technology.

The invention can be used for example for a single aisle ceiling vent or a lateral single aisle vent.

Other features which are considered as characteristic for the invention are set forth in the appended claims.

Although the invention is illustrated and described herein as embodied in an airflow-guiding component and a method of production, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
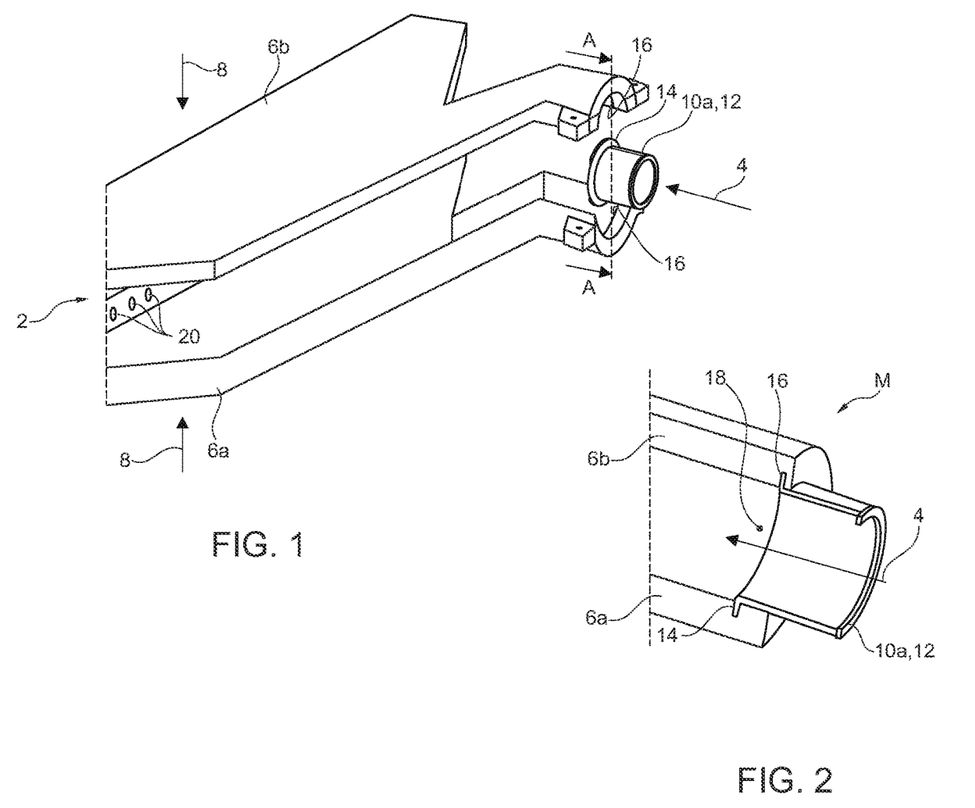
FIG. 1 is a diagrammatic, perspective view of an airflow-guiding component in a pre-assembly position with an end fitting.
FIG. 2 is an enlarged, fragmentary, perspective view of a portion of FIG. 1 in an assembled state.

Referring now to the figures of the drawings in detail and first, particularly, to FIG. 1 thereof, there is seen a component 2 for guiding an airflow 4 (in operation), as indicated by an arrow. The component 2 is a component for an air-conditioning system (not shown in further detail) of an aircraft. The component 2 contains two partial shells 6a, 6b, in this case in the form of half shells. The partial shells 6a, 6b are particle foam parts, that is to say parts that are made of or produced from particle foam. FIG. 1 shows a pre-assembly position, that is to say that the two partial shells 6a, 6b are not yet joined together. For assembly, the parts are moved towards one another in the direction of arrows 8 and (at the edges thereof, omitting inlet and outlet openings for airflow 4, see below) are interconnected in an airtight manner to form the component 2.

The component 2 contains a structural part 10a, in this case an end fitting 12. The end fitting 12 is used as a piece for connecting the component 2 to an adjoining pipeline (not shown). In an assembled state M and during operation, the airflow 4 is conducted through the end fitting 12 into the component 2. Before the process of joining the two partial shells 6a, 6b, the end fitting 12 is inserted in the partial shell 6a or 6b. For this purpose, the end fitting 12 includes a flange 14. The partial shells 6a, 6b each have a corresponding groove 16 for receiving the flange 14. The end fitting 12 is received in the rest of the component 2 in a form-locking and loss-proof manner by joining the two partial shells 6a, 6b to one another in the direction of the arrows 8.

FIG. 2 shows a portion or detail of FIG. 1 after the joining process in a cross section along a plane A-A and thus in the assembled state M of the component 2. The component 2 now has an inlet opening 18 for the airflow 4. In the present case, the end fitting 12 also includes the inlet opening 18, or the end fitting 12 is located in the inlet opening 18.

Figures 3, 4, 5, 6:
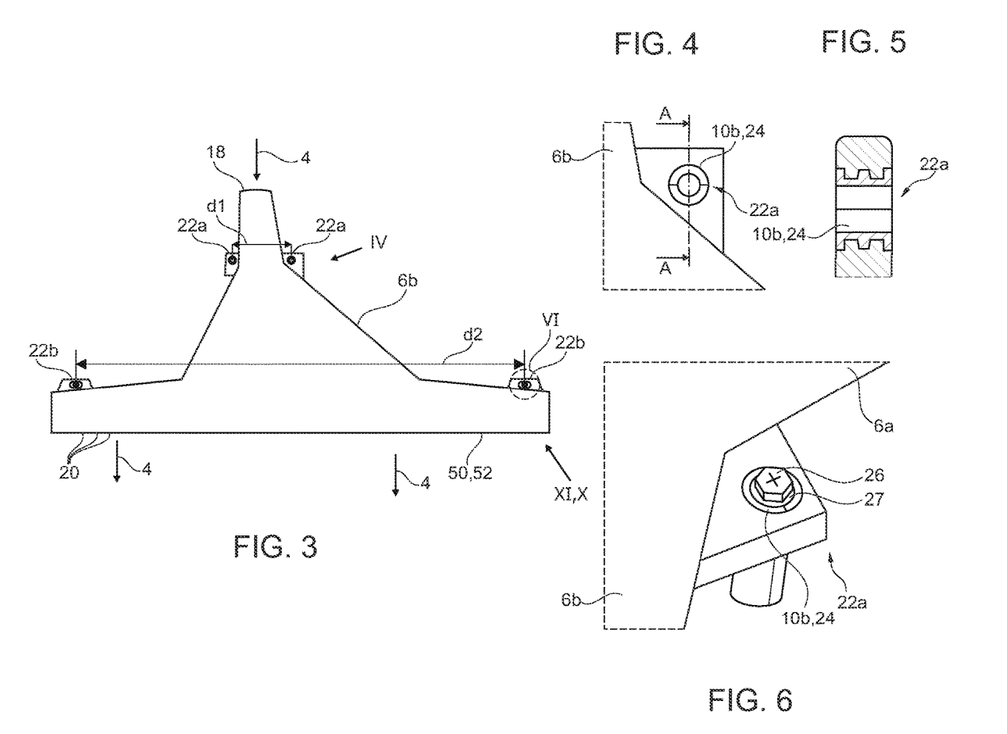
FIG. 3 is a plan view of the airflow-guiding component of FIG. 1 in the assembled state without an end fitting.
FIG. 4 is an enlarged view of the portion IV of FIG. 3.
FIG. 5 is a cross-sectional view taken along a line A-A of FIG. 4, in the direction of the arrows.
FIG. 6 is a perspective view of the assembly of FIG. 4 when fastened to a surface.

FIG. 3 shows the entire component 2 in the assembled state M, but omitting the end fitting 12. The component 2 includes a plurality of outlet openings 20 for the airflow 4, which openings are described in greater detail below.

The component 2 also includes a total of four retaining points 22a, 22b. The retaining points 22a, 2b are each located on extensions or molded-on portions (not described in greater detail) of the component 2. Two retaining points 22a are in the form of fixed bearings and two retaining points 22b are in the form of floating bearings.

FIG. 4 shows one of the retaining points 22a in the detail IV from FIG. 3. The retaining point 22a is formed in such a way that the extension has been made integrally from particle foam during the production of the partial shells 6a and/or 6b, and an additional structural part 10b, in this case a bush 24, has been embedded in the particle foam.

FIG. 5 shows a cross section along the plane A-A through FIG. 4. It can be seen in this drawing how the bush 24 is rigidly held in a form-locking manner in the partial shell 6a, 6b or the extension thereof by embedding.

FIG. 6 shows how the component 2, by using a screw 26 which is guided through the bush 24, and a washer 27 placed underneath, is screwed to a surface (not shown). As a result of a relatively small distance d1 of approximately 10 cm between the two retaining points 22a, hardly any changes in the length of the component 2 occur in the event of changes in temperature, and therefore, in this case, fixed bushes 24 are sufficient for screwing without causing noteworthy tensions in the component 2.

Figure 7:
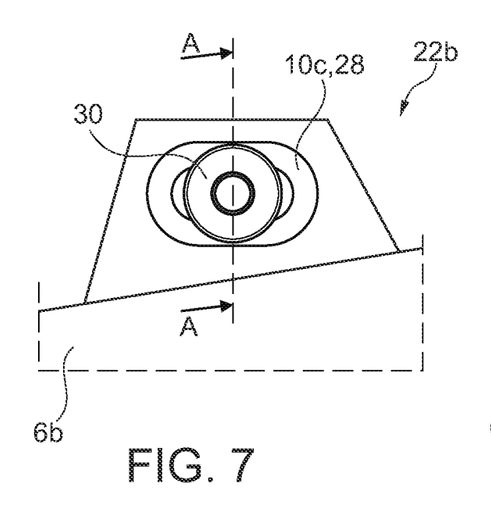
FIG. 7 is a plan view of a portion of FIG. 3.

FIG. 7 shows a detail from FIG. 3 and thus one of the retaining points 22b. However, in the same direction as the bush 24, as described above, a slot bush 28 is form-lockingly embedded as a structural part 10c in a molded-on, integral extension of the partial shells 6a, 6b. Inside the slot bush 28, a slide bush 30 which is provided in two parts (in order to be able to mount the bush) is slidably mounted so as to produce a floating bearing.

Figure 8:
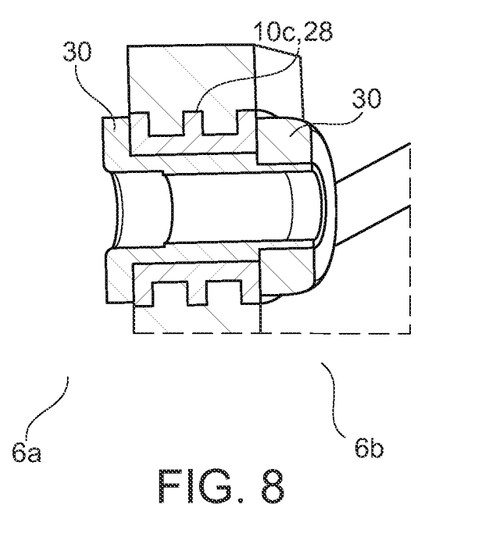
FIG. 8 is a cross-sectional view taken along a line A-A of FIG. 7, in the direction of the arrows.

FIG. 8 shows a cross section along the plane A-A through FIG. 7. It can be seen in this drawing how the slot bush 28 is permanently held in the partial shell 6a, 6b or the extension thereof by embedding, and how the two-part slide bush 30 is slidably guided in a linear manner in the slot bush 28.

Figure 9:
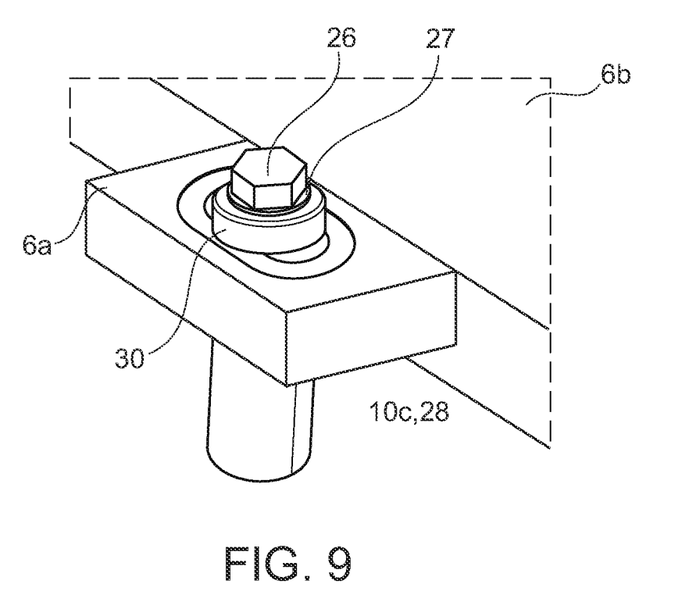
FIG. 9 is a perspective view of the assembly of FIG. 7 when fastened to a surface.

FIG. 9, corresponding to FIG. 6, shows how the component 2, by using a screw 26 which is guided through the slide bush 30, and the washer 27, is screwed in a linearly movable manner to a surface (not shown). As a result of the relatively large distance d2 of approximately 100 cm between the two retaining points 22a, noticeable changes in the length of the component 2 occur in the event of changes in temperature, and therefore, in this case, floating bearings including displaceable slide bushes 30 are selected for screwing to prevent noteworthy tensions in the component 2.

Figure 10:
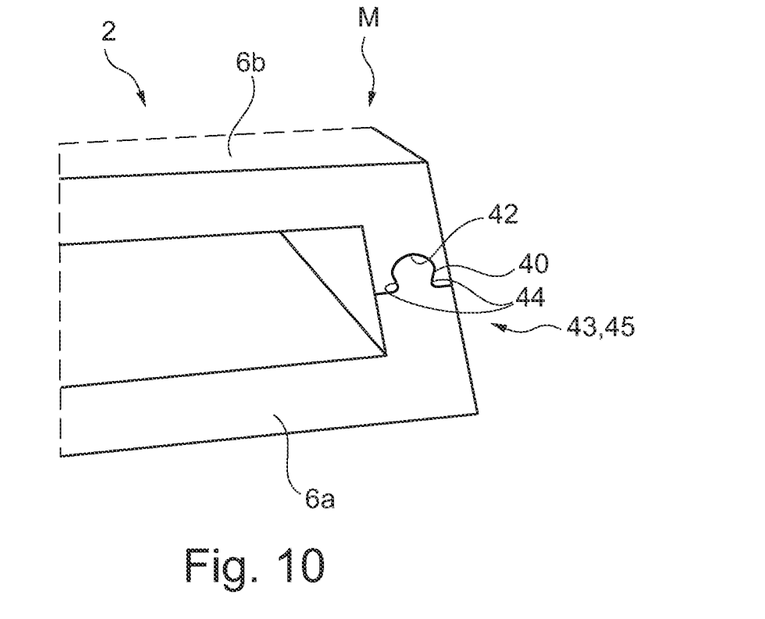
FIG. 10 is a perspective view of a portion X of FIG. 3.

FIG. 10 shows a detail X from FIG. 3. On the respective edge portions (except for only the inlet opening 18 and the outlet openings 20 and the region of the air-conducting element 50, see below) on which the partial shells 6a, 6b are to be interconnected in an airtight manner, the partial shell 6a includes a tongue 40, and the partial shell 6b includes a corresponding groove 42. An insertion connection 43 is thus formed. In this case, the tongue 40 has a slightly circular, convex shape, the groove 42 has a correspondingly concave construction, and therefore this groove forms an undercut 44 which is engaged behind by the tongue 40 when the insertion connection 43 is in the assembled state M or inserted state. The insertion connection 43 is thus in the form of a snap-fit connection 45.

The snap-fit connection 45 is stable enough to hold the partial shells 6a, 6b together during the final assembly of the component 2.

Figure 11:
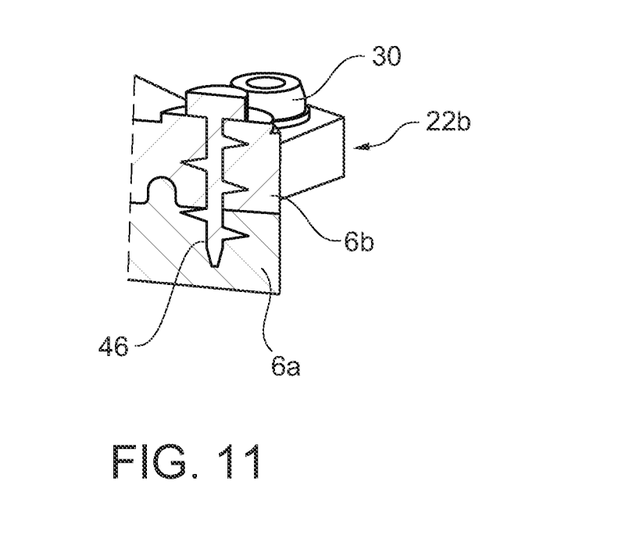
FIG. 11 is an alternative cross-sectional view of a securing element in the component in the region of the portion X.

FIG. 11 shows how, for the final securing of the partial shells 6a, 6b to one another, the component 2 also contains a plurality of securing elements 46, in this case in the form of self-tapping screws, which are screwed into the particle foam. For the sake of clarity, the securing elements 46 are not shown in the rest of the drawings.

Figure 12:
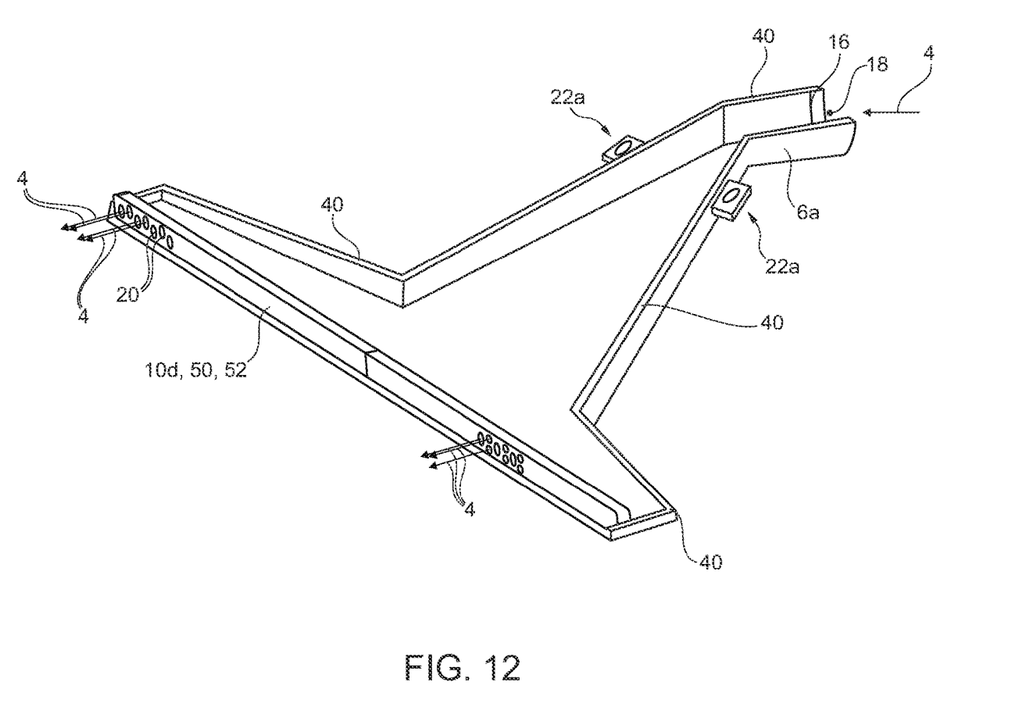
FIG. 12 is a perspective view of a half shell of the component of FIG. 1 without an end fitting but with an air-conducting element.

FIG. 12 once again shows the partial shell 6a in the pre-assembly state. As an additional structural part 10d, the component 2 contains an air-conducting element 50 which is covered in FIG. 1, in this case in the form of an outlet part 52 or an outlet geometry. The air-conducting element 50 includes the plurality of outlet openings 20 in the component 2. The structural part 10d is also a particle foam part which has been produced integrally together with the partial shell 6a, that is to say it is integrally integrated in the partial shell 6a. In contrast with an air-conducting element 50, which would be used for example as an injection-molded part (having a greatly different linear expansion in comparison with particle foam) between partial shells 6a, 6b, no problems occur as a result of a different linear expansion of the air-conducting element 50 and the partial shells 6a, 6b.

LIST OF REFERENCE SIGNS 2 component
4 air
6a, b partial shell
8 arrow
10a-d structural part
12 end fitting
14 flange
16 groove
18 inlet opening
20 outlet opening
22a, b retaining point
24 bush
26 screw
27 washer
28 slot bush
30 slide bush
40 tongue
42 groove
43 insertion connection
44 undercut
45 snap-fit connection
46 securing element
50 air-conducting element
52 outlet part
M assembled state

The invention claimed is:

1. A component to be mounted in an interior of an aircraft cabin for guiding an airflow in an air-conditioning system of an aircraft, the component comprising:
at least one inlet opening and a plurality of outlet openings for air, said outlet openings leading into a free space in the interior of the aircraft;
a plurality of structural parts, at least some of said structural parts being particle foam parts, at least one of said structural parts being an air-conducting element, said air-conducting element being an outlet part and being a particle foam part, said outlet part being an outlet grille having said outlet openings for air; and
at least two partial shells being particle foam parts, said at least two partial shells being interconnected in an airtight manner and keeping said at least one inlet opening and said outlet openings clear.

2. The component according to claim 1, wherein said air-conducting element brings about airflow guidance in the component.

3. The component according to claim 1, wherein one of said structural parts is integrated into one of said at least two partial shells as one piece or one of said structural parts is separate from said at least two partial shells.

4. The component according to claim 1, wherein one of said structural parts is not a particle foam part, and said structural part which is not a particle foam part is embedded in particle foam of one of said at least two partial shells.

5. The component according to claim 4, wherein said structural part which is not a foam part is a bush or a slot bush.

6. The component according to claim 1, wherein one of said structural parts is an end fitting having said at least one inlet opening.

7. The component according to claim 6, wherein said end fitting is form-lockingly received between said at least two partial shells and fastened in the component, and said end fitting is configured to be form-lockingly inserted between said at least two partial shells when said at least two partial shells are joined.

8. The component according to claim 1, wherein said at least two partial shells include a detachable insertion connection for connection to one another.

9. The component according to claim 8, wherein said insertion connection is a snap-fit connection including an undercut to be engaged behind in an inserted state.

10. The component according to claim 1, which further comprises a securing element fixing said at least two partial shells to one another.

11. The component according to claim 1, wherein the particle foam is expanded polypropylene.

12. A method for producing a component for guiding an airflow in an air-conditioning system of an aircraft, the method comprising:
providing the component according to claim 1:
producing said at least two partial shells from particle foam; and
interconnecting said at least two partial shells to form the component.

* * * * *